May 15, 1956  D. J. WILLIAMS  2,745,432
NON-RETURN VALVES
Filed Dec. 10, 1952
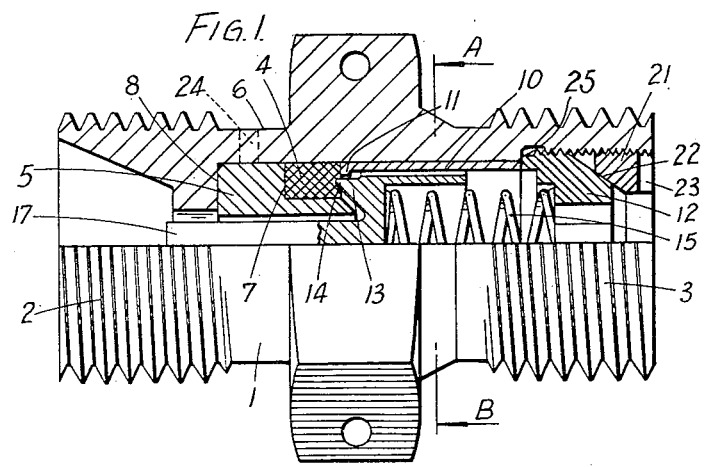
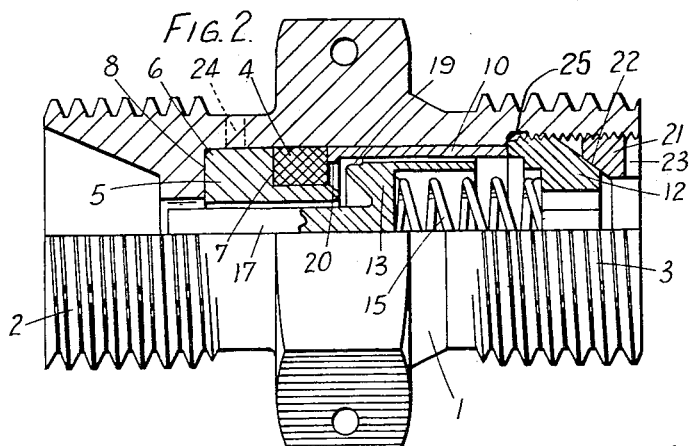
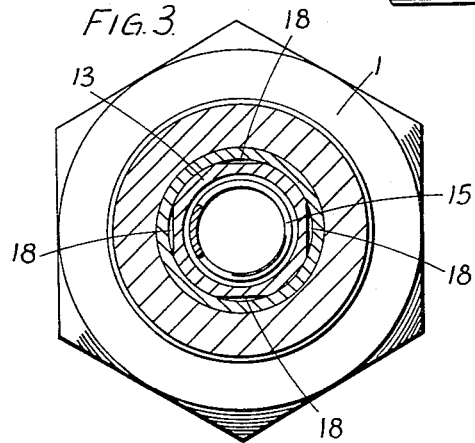
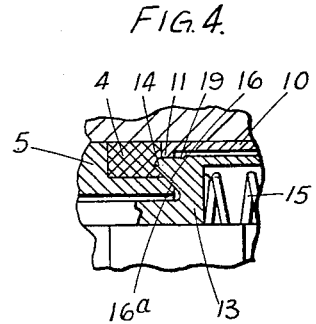
INVENTOR:
DERRICK JOHN WILLIAMS
BY:-
Greene, Pinckes & Durr
ATTORNEY

United States Patent Office 2,745,432
Patented May 15, 1956

2,745,432
NON-RETURN VALVES

Derrick J. Williams, Kenton, England, assignor to High-Pressure Components Limited, London, England Application December 10, 1952, Serial No. 325,059

3 Claims. (Cl. 137—540)

The non-return valve forming the subject of the present invention is particularly intended for use as a charging valve, i. e., for association with a reservoir or container which has necessarily to be charged with gas, air or hydraulic fluid by way of the valve. Such valves are called upon to withstand considerable internal pressure and it is essential therefore that the design of the valve shall be such that leakage of fluid between the valve and its seating will be prevented even though the pressure of fluid in the container is considerable. One application of such a valve is in connection with oleo-pneumatic undercarriage legs of aircraft where it is necessary to top up the leg periodically with air supplied under pressure.

It is the practice in the construction of such nonreturn valves to employ a rubber ring-like sealing member carried by the movable spring urged valve piston which rubber member was located in an annular recess in the end of the piston and engaged on annular metal seating fixedly mounted in the body. This arrangement was not entirely satisfactory in practice as the rubber sealing ring was liable to be accidentally displaced out of its recess.

The chief object of the present invention is to evolve a construction which will not have the above mentioned disadvantage and will withstand the higher working pressures now commonly encountered in modern gas, air and hydraulic systems.

Referring to the drawings:

Figure 1 is a longitudinal section of a charging valve in accordance with the invention, the valve being shown in its closed position:

Figure 2 is a similar view the valve being open:

Figure 3 is a cross section on the line A—B in Figure 1:

Figure 4 is a fragmentary sectional view showing the position of the movable valve component when subjected to a high internal pressure.

The invention is shown applied to a charging valve comprising a body 1 having externally screw threaded ends 2 and 3 for connection with the source of gas, air or hydraulic fluid pressure supply and the reservoir or container respectively.

The body contains an annular rectangular section ring-like valve seat 4 composed of natural or synthetic rubber or of a thermo-plastic synthetic resin, the valve seat encircling and being carried by a tubular seat carrier 5 frictionally located within a boring 6 in the body, the seat abutting against an annular shoulder 7 on the carrier and the surrounding part of the body, the carrier abutting against an annular shoulder 8 on the body. The annular seating may, if desired, be bonded to the part 5, the seating and carrier being in any case inserted into the body as a unit from the end 3 of the body.

The body contains a seating retaining sleeve 10 having an inwardly directed annular shoulder 11 the retaining sleeve engaging the valve seat 4 near its periphery to hold the seat firmly against axial movement in the direction of the end 3 of the body.

The retaining sleeve 10 is maintained in the position shown by means of a hollow nut 12 in threaded engagement with internal screw threads formed on the interior surface of the part 3.

A piston valve 13 is mounted for axially sliding movement in the retaining sleeve 10, the piston valve being formed with an annular ring-like valve face 14 which makes linear engagement with the valve seat 4 to provide a good seal, the parts being held normally in operative engagement and in the position shown in Figure 1 by a coil spring 15 located within the hollow interior of the piston valve and entering a recess in the inner face of the nut 12 against which it abuts. Alternatively the end of the piston valve may be flat where it makes contact with the valve seat. The seat 4 is only depressed a small amount, approximately ten thousandths of an inch in normal use and to prevent the seat being damaged as a result of excessive pressure of the piston valve consequent upon a high internal fluid pressure in the reservoir, the piston valve and seat carrier are internally and externally tapered respectively as at 16 and 16a (see Figure 4) so that they abut and thus prevent excessive depression and possible injury to the valve seat. The piston valve is formed with a central spigot 17 by means of which the piston valve can be moved off its seat if it is desired to reduce the fluid pressure in the reservoir or container.

The piston valve is of the cross-sectional shape shown in Figure 3, i. e., it is of square cross-section having its corners radiused to the same radius of curvature as the inner surface of the retaining sleeve. In this way four passageways 18 are formed for the passage of fluid between the piston valve and the retaining sleeve and consequently with the valve off its seating as shown in Figure 2 (the piston valve having been forced off its seat under incoming fluid pressure) the fluid can find its way between the valve and its seat and thence through the passageways 18, through the central opening in the nut 12 and into the reservoir or other container.

The nose end of the piston valve is of annular form and has its diameter reduced as at 19 below the depth of the passageways 18, this part of reduced diameter being a clearance fit in an annular inwardly directed shoulder 20 on the end of the retaining sleeve 10, the clearance being such that it will permit the passage of fluid when the piston valve is just clear of its seat. The parts when the valve is fully open will, however, occupy the position shown in Figure 2 there being permitted in that position a relatively unrestricted flow of fluid past the valve. In practice, however, this position is rarely, if ever, reached the clearance between the nose of the piston valve and shoulder 20 being adequate for the passage of air.

Instead of being of square cross-section with radiused corners, the piston valve may be produced with any other number of flats or may be of any other shape which will provide the required number of passageways.

The nut 12 is locked against inadvertent rotation by means of a locking nut 21 having a tapering face 22 which engages a correspondingly tapered face on the nut 12, the locking nut being formed with a diametral slot 23 for engagement by a screw driver.

To avoid any possibility of the piston valve being lifted off its seating an amount sufficient to cause leakage of fluid past the valve as a result of fluid finding its way between the retaining sleeve and the boring in the body a bleed hole 24 may be provided which prevents any build up of fluid pressure which might be sufficient to lift the valve off its seating.

On removal of the lock nut 21 and nut 12 all the component parts can easily be removed for servicing or replacement.

Instead of using the lock nut 21 the parts may be held in position by peening over the end of the body or by using a circlip or other locking member.

To prevent the nut 12 being over tightened and thus causing damage to the seating 4 the body may be formed with an internal shoulder 25 which is finally engaged by the nut or if otherwise positioned by a part of the retaining sleeve.

I claim:

1. A non-return charging type valve adapted to be connected to a container to be charged with a fluid at high pressures, comprising a housing body having an axial boring extending therethrough to provide an outlet at a first end and an inlet at the opposite end thereof, the first end of said housing body being adapted to be connected to said container, said boring including a cylindrical portion ending adjacent an inward annular shoulder and extending from said shoulder toward said first end of said housing, a tubular seat carrier axially arranged in said cylindrical portion with a first end thereof abutting against said annular shoulder, the other end of said tubular seat carrier having a reduced outside diameter, an annular resilient elastomeric valve seating fitted between and substantially completely filling the space between the cylindrical portion of said boring and that portion of said seat carrier having the reduced outside diameter, a retaining sleeve in said cylindrical portion having one end which abuts an outer annular region of said valve seating leaving exposed a portion of the surface of the elastomeric valve seating between the boring and the seat carrier, a valve member having an inwardly tapering annular nose portion for engaging said valve seating axially slidable in said sleeve into engagement with the exposed surface of said valve seating, said valve member being shaped at its exterior surface to provide fluid passageways between said valve member and said sleeve, a coil spring engaging said valve member to normally hold said valve member in contact with said valve seating.

2. A non-return charging type valve adapted to be connected to a container to be charged with a fluid at high pressures, comprising a housing body having an axial boring extending therethrough to provide an outlet at a first end and an inlet at the opposite end thereof, the first end of said housing body being adapted to be connected to said container, said boring including a cylindrical portion ending adjacent an inward annular shoulder and extending from said shoulder toward said first end of said housing, a tubular seat carrier axially arranged in said cylindrical portion with a first end thereof abutting against said annular shoulder, the other end of said tubular seat carrier having a reduced outside diameter, an annular resilient elastomeric valve seating fitted between and substantially completely filling the space between the cylindrical portion of said boring and that portion of said seat carrier having the reduced outside diameter, a retaining sleeve in said cylindrical portion having one end which abuts an outer annular region of said valve seating leaving exposed a portion of the surface of the elastomeric valve seating between the boring and the seat carrier, a valve member axially slidable in said sleeve into engagement with the exposed surface of said valve seating, said valve member being shaped at its exterior surface to provide fluid passageways between said valve member and said sleeve and having an inwardly tapering annular nose portion for engaging said valve seating, a coil spring engaging said valve member to normally hold said valve member in contact with said valve seating, said seat carrier having a corresponding annular portion for engaging with a region of the inwardly tapering nose portion of the valve to limit the depression of the valve seating by said valve member.

3. A non-return charging type valve adapted to be connected to a container to be charged with a fluid at high pressures, comprising a housing body formed with an axial boring extending therethrough to provide an outlet at a first end and an inlet at the opposite end thereof, the first end of said housing body being adapted to be connected to said container, said boring including a cylindrical portion ending adjacent an inward annular shoulder and extending from said shoulder toward said first end of said housing, a tubular seat carrier axially arranged in said cylindrical portion with a first end thereof abutting against said annular shoulder, the other end of said tubular seat carrier having a reduced outside diameter, an annular resilient elastomeric valve seating fitted between and substantially completely filling the space between the cylindrical portion of said boring and that portion of said seat carrier having the reduced outside diameter, a retaining sleeve in said cylindrical portion having one end which abuts an outer annular region of said valve seating, leaving exposed a portion of the surface of the elastomeric valve seating between the boring and the seat carrier, a valve member axially slidable in said sleeve into engagement with the exposed surface of said valve seating, said valve member being shaped at its exterior surface to provide fluid passageways between said valve member and said sleeve, a coil spring engaging said valve member to normally hold said valve member in contact with said valve seating, all of said valve seat carrier, said valve seating, said sleeve and said spring being insertable into said cylindrical portion of said boring from the first end of said housing, means adjacent the first end of said housing for holding said elements in place, said means for holding the elements in place comprises an externally threaded nut, internal threads adjacent the first end of said housing for receiving said nut, and an externally threaded locking member for locking said nut in place.

References Cited in the file of this patent

UNITED STATES PATENTS

| | | |
|---|---|---|
| 632,422 | McLaughlin | Sept. 5, 1899 |
| 1,473,321 | Rumfelt | Nov. 6, 1923 |
| 1,805,342 | Otto | May 12, 1931 |
| 1,954,044 | Guilford | Apr. 10, 1934 |
| 2,206,356 | Hutchings | July 2, 1940 |
| 2,392,501 | Pool | Jan. 8, 1946 |
| 2,478,760 | Holicer | Aug. 9, 1949 |
| 2,481,713 | Bertea | Sept. 13, 1949 |
| 2,524,129 | Klein | Oct. 3, 1950 |
| 2,570,909 | Benson | Oct. 9, 1951 |
| 2,653,792 | Sacchini | Sept. 29, 1953 |